UNITED STATES PATENT OFFICE.

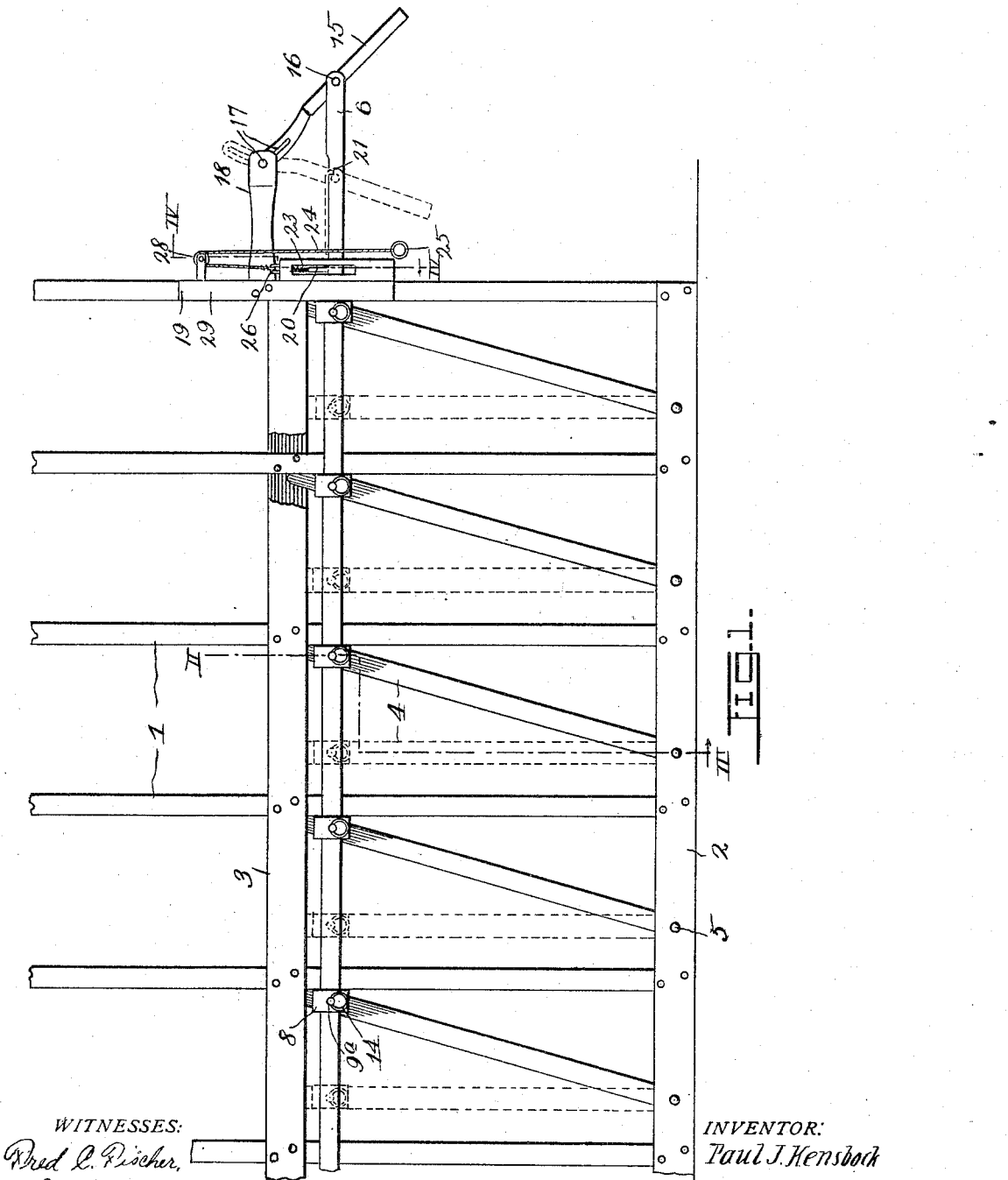

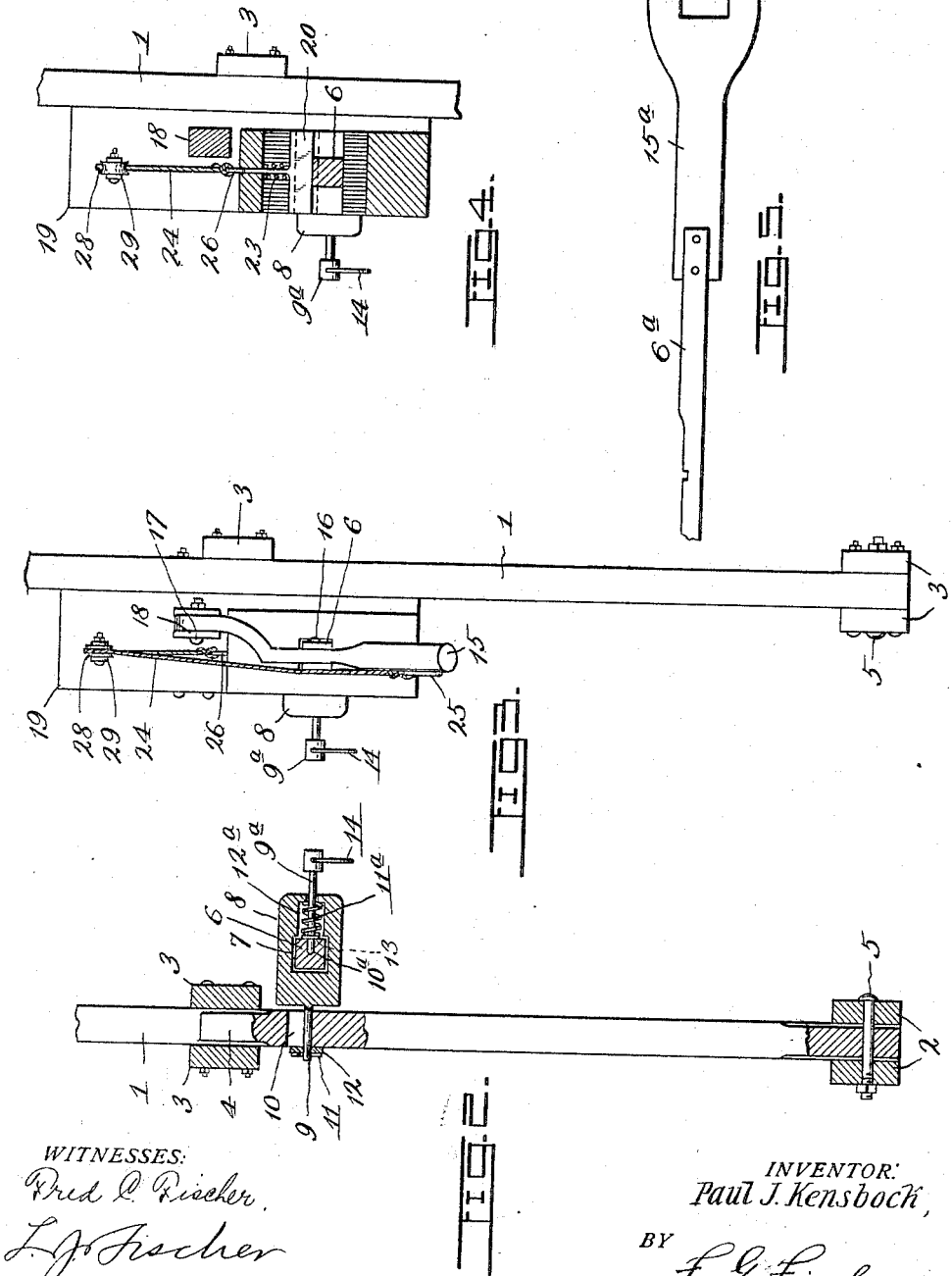

PAUL J. KENSBOCK, OF EASTON, KANSAS.

CATTLE-STANCHION.

1,203,009.

Specification of Letters Patent.

Patented Oct. 31, 1916.

Application filed February 7, 1916. Serial No. 76,597.

*To all whom it may concern:*

Be it known that I, PAUL J. KENSBOCK, a citizen of the United States, residing at Easton, in the county of Leavenworth and State of Kansas, have invented certain new and useful Improvements in Cattle-Stanchions, of which the following is a specification.

My invention relates to cattle stanchions of the class employed in dairies for holding cows during the milking process, and my object is to provide an apparatus of this character whereby all of the cows standing in a row can be simultaneously secured, and thus save the time and labor required in securing each cow separately as heretofore. Likewise, the cows can be simultaneously released, but as it is often desirable to release each cow immediately after being milked, I have arranged the apparatus so that they can be released one at a time.

In order that the invention may be fully understood, reference will now be made to the accompanying drawings, in which:

Figure 1 is an elevation of the apparatus. Fig. 2 is a vertical section on line II—II of Fig. 1. Fig 3 is an end elevation of the apparatus. Fig. 4 is an enlarged section on line IV—IV of Fig. 1, showing a latch employed in carrying out the invention. Fig. 5 is a modified form of actuating means.

In carrying out the invention, I employ a plurality of upright stationary members 1 spaced apart and extending, preferably, from the floor to the overhead stringers of the barn in which the apparatus is installed. The stationary members 1 are united at their lower ends by a pair of horizontal beams 2 and intermediate their ends by a pair of horizontal beams 3.

The beams 2 and 3 are secured to the front and rear sides of the stationary members 1 to admit a plurality of movable members 4, which extend between each pair of beams and are adapted to coact with the stationary members 1 in holding cattle by the neck in the customary manner. The lower ends of the movable members 4 are mounted upon pivots 5, while their upper free ends extend between the beams 3, which prevent them from being pushed forwardly or backwardly by the cattle.

6 designates an actuating bar for simultaneously adjusting the movable members 4 to either the full or dotted line positions disclosed by Fig. 1. Said actuating bar extends freely through openings 7 in a row of connecting members 8, provided at their rear ends with pivots 9, which extend through slots 10 and are secured by cotter-pins 11 and washers 12. The slots 10 extend through the movable members 4 and permit the same to describe an arc struck from their pivots 5 without causing the actuating bar and the connecting members 8, which move backward and forward in the same horizontal plane, to bind.

Each connecting member 8 has a detent $9^a$ adapted to register with a recess $10^a$ in the actuating bar 6, to lock the same and the connecting member together. The detent $9^a$ is automatically pushed into the recess $10^a$ by a coil spring $11^a$, arranged in a recess $12^a$ in the connecting member 8 and presses at its terminals against one end of said recess and a collar 13 fixed to the detent $9^a$. Each detent $9^a$ is provided with a ring 14, whereby it may be withdrawn from the recess $10^a$ when it is desired to disengage any of the movable members 4 from the actuating bar 6.

The actuating bar 6, in its preferred form, is operated by a lever 15, connected by a pivot 16 to the adjacent end of said actuating bar and having a pin-and-slot connection 17 with a bracket 18, projecting from a block 19 secured to one of the stationary members 1.

20 designates a latch adapted to enter a notch 21 in the actuating bar 6, to lock the same in the position disclosed by Fig. 1. Said latch 20 is mounted in a slotted case 22 and normally held in engagement with the actuating bar 6 by a coil spring 23.

The latch 20 is withdrawn from the notch 21 by a cable 24, provided at its lower end with a handle 25 and connected at its upper end to a pin 26, projecting forwardly from the latch 20. In its passage to the pin 26, the cable 24 runs over a pulley 28 mounted in a bracket 29, projecting from the adjacent side of the bracket 19.

The operation briefly stated is as follows: When the parts are in the full line position disclosed by Fig. 1, the cattle may be driven forward until the neck of each extends between a stationary member 1 and its coacting movable member 4. The lever 15 is then swung to the dotted position to adjust the free ends of the movable members 4 toward members 1 and secure the cattle from moving forward or backward. When the movable members 4 reach the dotted position, they are reliably secured in such position by the latch 20, which is pressed downwardly by the spring 23 into the notch 21 and thus locks the actuating bar 6 from longitudinal movement. If the cattle are to be released simultaneously, the latch 20 is released from the notch 21 by pulling downwardly upon the handle 25, and while still holding said handle the operator swings the lever 15 back to the full line position, which operation adjusts all of the movable members 4 to their full line position also. However, if it is desired to release each animal independently, the latch 20 is left in engagement with the notch 21 and each detent 9ª is separately withdrawn from the actuating bar 6, so that its respective movable member 4 can be swung to the full line position.

In the modified form disclosed by Fig. 5 the parts are the same, except the lever 15 is replaced by a handle 15ª formed on the end of the actuating bar 6ª. This latter form is a little more simple and inexpensive than the preferred form, and is easy to operate when only a limited number of movable members 4 are employed.

Having thus described my invention, what I claim and desire to secure by Letters Patent, is:

In a cattle stanchion, a series of pivoted cattle engaging elements each having a slot, a member for each element, each member having a pivot pin extending through the respective slots and also having an opening with a chamber leading out therefrom, said slots being of a shape so as to allow the outer ends of the elements to have arc-like movement, means to secure the pivot pins to the elements, an actuating bar passed through the openings of said members and having a notch, a detent slidable in the recess of each member and engageable in the bar notch, a coil spring surrounding each detent and guidingly housed within the chambers of the members, and means to actuate the bar.

In testimony whereof I affix my signature, in the presence of two witnesses.

PAUL J. KENSBOCK.

Witnesses:
L. J. FISCHER,
FRED C. FISCHER.

Copies of this patent may be obtained for five cents each, by addressing the "Commissioner of Patents, Washington, D. C."